US012572711B2

(12) United States Patent
Benjamin et al.

(10) Patent No.: US 12,572,711 B2
(45) Date of Patent: Mar. 10, 2026

(54) GENERATIVE DESIGN TECHNIQUES FOR MULTI-FAMILY HOUSING PROJECTS

(71) Applicant: AUTODESK, INC., San Francisco, CA (US)

(72) Inventors: David Benjamin, Brooklyn, NY (US); Dale Zhao, New York, NY (US); Lorenzo Villaggi, Brooklyn, NY (US)

(73) Assignee: AUTODESK, INC., San Francisco, CA (US)

( * ) Notice: Subject to any disclaimer, the term of this patent is extended or adjusted under 35 U.S.C. 154(b) by 425 days.

(21) Appl. No.: 17/099,735

(22) Filed: Nov. 16, 2020

(65) Prior Publication Data

US 2021/0150085 A1    May 20, 2021

Related U.S. Application Data

(60) Provisional application No. 62/937,185, filed on Nov. 18, 2019.

(51) Int. Cl.
| | |
|---|---|
| *G06F 30/13* | (2020.01) |
| *G06F 30/12* | (2020.01) |
| *G06F 30/20* | (2020.01) |
| *G06F 111/02* | (2020.01) |
| *G06F 111/04* | (2020.01) |

(52) U.S. Cl.
CPC .............. *G06F 30/13* (2020.01); *G06F 30/12* (2020.01); *G06F 30/20* (2020.01); *G06F 2111/02* (2020.01); *G06F 2111/04* (2020.01)

(58) Field of Classification Search
None
See application file for complete search history.

(56) References Cited

U.S. PATENT DOCUMENTS

| | | | | |
|---|---|---|---|---|
| 6,771,293 | B1 * | 8/2004 | Josephson | .............. G06Q 10/06 |
| | | | | 707/999.003 |
| 6,859,768 | B1 * | 2/2005 | Wakelam | ................ G06F 30/17 |
| | | | | 703/1 |

(Continued)

FOREIGN PATENT DOCUMENTS

| | | | | |
|---|---|---|---|---|
| CN | 112948922 | A | * 6/2021 | ............. G06F 18/23 |

OTHER PUBLICATIONS

Beirão, José. CItyMaker: designing grammars for urban design. TU Delft, pp. 276, 2012. (Year: 2012).*

(Continued)

*Primary Examiner* — Akash Saxena
(74) *Attorney, Agent, or Firm* — Artegis Law Group, LLP

(57) ABSTRACT

A design engine automatically generates designs for multi-family housing projects that simultaneously meet local construction regulations while also meeting specific financial targets. The design engine includes a design analyzer, a site analyzer, a design generator, and a design evaluator. The design analyzer generates design trends based on a historical database of designs. The site analyzer generates design criteria based on relevant construction regulations. The design generator generates design options that reflect the design trends while also adhering to the construction regulations. The design evaluator then analyzes the design options and generates various design metrics. Based on the design metrics, the design generator generates additional design options that better meet the design criteria.

21 Claims, 5 Drawing Sheets

(56) References Cited

U.S. PATENT DOCUMENTS

| | | | | |
|---|---|---|---|---|
| 7,376,542 | B2 * | 5/2008 | Beuttel | G06F 30/20 |
| | | | | 703/6 |
| 7,552,032 | B2 * | 6/2009 | Krishnapillai | G06F 30/00 |
| | | | | 703/2 |
| 7,996,344 | B1 * | 8/2011 | Goel | G06F 30/00 |
| | | | | 706/13 |
| 8,006,220 | B2 * | 8/2011 | McConaghy | G06F 30/36 |
| | | | | 716/132 |
| 8,055,485 | B2 * | 11/2011 | Keller | G06F 17/18 |
| | | | | 703/22 |
| 8,160,842 | B2 * | 4/2012 | Klipfel, III | G06F 30/13 |
| | | | | 703/1 |
| 8,185,428 | B1 * | 5/2012 | Campo | G06Q 10/0639 |
| | | | | 705/7.38 |
| 8,648,854 | B2 | 2/2014 | Putnam et al. | |
| 9,507,885 | B2 * | 11/2016 | Yu | G06F 30/13 |
| 9,690,880 | B2 * | 6/2017 | Iorio | G06F 30/00 |
| 9,852,235 | B2 * | 12/2017 | Basudhar | G06F 30/00 |
| 10,366,180 | B2 * | 7/2019 | Detwiler | G06F 30/13 |
| 10,733,332 | B2 * | 8/2020 | Chiang | G06F 30/00 |
| 11,205,024 | B2 * | 12/2021 | Benjamin | G06F 30/13 |
| 11,256,834 | B2 * | 2/2022 | Benjamin | G06F 30/17 |
| 11,816,397 | B2 * | 11/2023 | Benjamin | G06Q 10/00 |
| 12,135,920 | B2 * | 11/2024 | Benjamin | G06F 30/20 |
| 2004/0004611 | A1 * | 1/2004 | Komornicki | G06F 16/29 |
| | | | | 345/418 |
| 2005/0114017 | A1 * | 5/2005 | Putnam | G06F 30/00 |
| | | | | 701/532 |
| 2012/0203562 | A1 * | 8/2012 | Krebs | G06F 30/13 |
| | | | | 705/1.1 |
| 2013/0132041 | A1 * | 5/2013 | Sigaty | G06F 30/13 |
| | | | | 703/1 |
| 2014/0149084 | A1 | 5/2014 | Iorio | |
| 2016/0092606 | A1 * | 3/2016 | Basudhar | G06F 30/00 |
| | | | | 703/1 |

| | | | | |
|---|---|---|---|---|
| 2017/0024497 | A1 * | 1/2017 | Lyu | G06F 30/20 |
| 2017/0076015 | A1 * | 3/2017 | Patel | G06F 30/18 |
| 2017/0076017 | A1 * | 3/2017 | Yu | G06F 30/13 |
| 2018/0268087 | A1 * | 9/2018 | Tierney | G06F 30/13 |
| 2019/0050502 | A1 * | 2/2019 | Santarone | G06F 30/13 |
| 2019/0147117 | A1 * | 5/2019 | Benjamin | G06F 30/13 |
| | | | | 703/1 |
| 2019/0188339 | A1 * | 6/2019 | Cho | G06F 30/13 |
| 2019/0325095 | A1 * | 10/2019 | Lekivetz | G06F 30/20 |
| 2020/0013127 | A1 * | 1/2020 | Gozes | G06F 30/13 |
| 2020/0025957 | A1 * | 1/2020 | Guo | G06F 30/13 |
| 2020/0151923 | A1 * | 5/2020 | Bergin | G06T 17/10 |
| 2020/0250280 | A1 * | 8/2020 | Chopson | G06F 30/13 |
| 2021/0034710 | A1 * | 2/2021 | Maxwell, III | G06F 30/00 |
| 2021/0150083 | A1 * | 5/2021 | Benjamin | G06F 30/12 |
| 2021/0150084 | A1 * | 5/2021 | Benjamin | G06F 30/20 |
| 2021/0150085 | A1 * | 5/2021 | Benjamin | G06F 30/13 |
| 2021/0150095 | A1 * | 5/2021 | Benjamin | G06F 30/12 |
| 2024/0087062 | A1 * | 3/2024 | Woolf | G06Q 50/16 |
| 2024/0193329 | A1 * | 6/2024 | Fulton | G06F 30/18 |

OTHER PUBLICATIONS

Martins, Tathiane Al,et al, "From solar constraints to urban design opportunities: Optimization of built form typologies in a Brazilian tropical city." Energy and Buildings 76 (2014): 43-56. (Year: 2014).*

U.S. Appl. No. 17/099,708 Non-Final Action Dated Jun. 14, 2023 (Copening Application) (Year: 2023).*

International Search Report for application No. PCT/US2020/060865 dated Feb. 5, 2021.

Jia et al., "Development of CAD Software for Raw-Soil Structure Residence Building", Computer Aided Engineering, vol. 20, No. 3, Sep. 2011, 4 pages.

* cited by examiner

DESIGN OPTION
222

302

300

310

312

314

314

320

GENERATIVE DESIGN TECHNIQUES FOR MULTI-FAMILY HOUSING PROJECTS

CROSS-REFERENCE TO RELATED APPLICATIONS

This application claims the priority benefit of United States provisional patent application titled, "Generative Design Techniques for Multi-Family Housing Projects," filed on Nov. 18, 2019 and having Ser. No. 62/937,185. The subject matter of this related application is hereby incorporated herein by reference.

BACKGROUND

Field of the Various Embodiments

The various embodiments relate generally to computer-aided design technology and, more specifically, to generative design techniques for multi-family housing projects.

Description of the Related Art

A residential design company or other organization occasionally generates designs on a "speculative" basis by identifying an undeveloped parcel of land that is zoned for residential development and then proposing a design for a multi-family housing project to the landowner who owns the parcel. If the landowner approves of the proposed design, or some version thereof, then the landowner can engage with the residential design organization to develop the parcel according to the proposed design. Once the multi-family housing project is complete, the landowner typically rents or leases the individual housing units within the multi-family housing project to different families in order to provide those families with housing and to generate a recurring revenue stream. In this fashion, the residential design company or other organization benefits landowners who own undeveloped parcels as well as families in need of housing.

A residential design company or other organization that operates on a "speculative" basis usually includes a design team that is tasked with generating different designs for target multi-family housing projects. The design team typically uses computer-aided design (CAD) software or similar software to generate the different designs. One of the challenges faced when generating a given design is how to optimally position various design elements, such as buildings, parking lots and spaces, walkways, and other common design elements relative to the property boundaries of a given undeveloped parcel of land. Another challenge faced when generating a given design is ensuring that the design is compliant with local construction regulations and, accordingly, considered "feasible" to regulators and also ensuring that the design meets specified financial targets and, accordingly, is considered "desirable" to landowners.

The different designs generated by a design team conceptually occupy distinct positions within a multi-dimensional "design space" that encompasses the universe of possible designs that could be generated for a given undeveloped parcel of land. Most of the designs included in the design space are either unfeasible or undesirable or both because those designs do not comply with the relevant construction regulations and/or do not meet the relevant financial targets. A small number of designs included in the design space are considered both feasible and desirable because those designs both comply with the relevant construction regulations and meet the relevant financial targets. Feasible and desirable designs are comparatively scarce in the design space because design features that promote compliance with construction regulations tend to reduce financial performance and, similarly, design features that promote financial performance tend to reduce compliance with regulations. During the design process, the design team explores the design space in an attempt to generate as many designs as possible that are considered both feasible and desirable. As a general matter, the greater the number of feasible and desirable designs that can be generated, the greater the likelihood that an optimal design for a given target project can be determined.

One drawback of current approaches to generating designs for multi-family housing projects is that conventional CAD software is not configured to effectively navigate the design space and steer the design process towards regions of the design space where both feasible and desirable designs reside. In this regard, one limitation of conventional CAD software is that conventional CAD software does not incorporate functionality to automatically balance regulatory compliance with financial performance when traversing the overall design space. Consequently, designs generated using conventional CAD software are predominately infeasible, undesirable, or both, which substantially reduces the likelihood of determining an optimal design for a given target project. Another limitation of conventional CAD software is that conventional CAD software does not incorporate functionality to automatically modify a given design based on feedback received from a landowner without adversely impacting either the desirability or the feasibility of the design, which further reduces the likelihood of determining an optimal design for a given target project.

As the foregoing illustrates, what is needed in the art are more effective techniques for generating designs for multi-family housing projects.

SUMMARY

Various embodiments include a computer-implemented method for generating designs for multi-family housing projects via a computer-aided design (CAD) application, including generating, via a design analyzer included in the CAD application, a set of design trends based on a geometric analysis of a plurality of historical designs, generating, via a site analyzer included in the CAD application, a set of design criteria that describe one or more construction regulations associated with a first parcel of land, generating, via a design generator included in the CAD application, a first design option for developing the first parcel of land, wherein the first design option includes at least one geometric attribute derived from the set of design trends and complies with each of the one or more construction regulations.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. These technical advantages represent tangible and meaningful technological improvements over conventional CAD applications.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
FIG. 1 illustrates a system configured to implement one or more aspects of the various embodiments.
Figure 1:
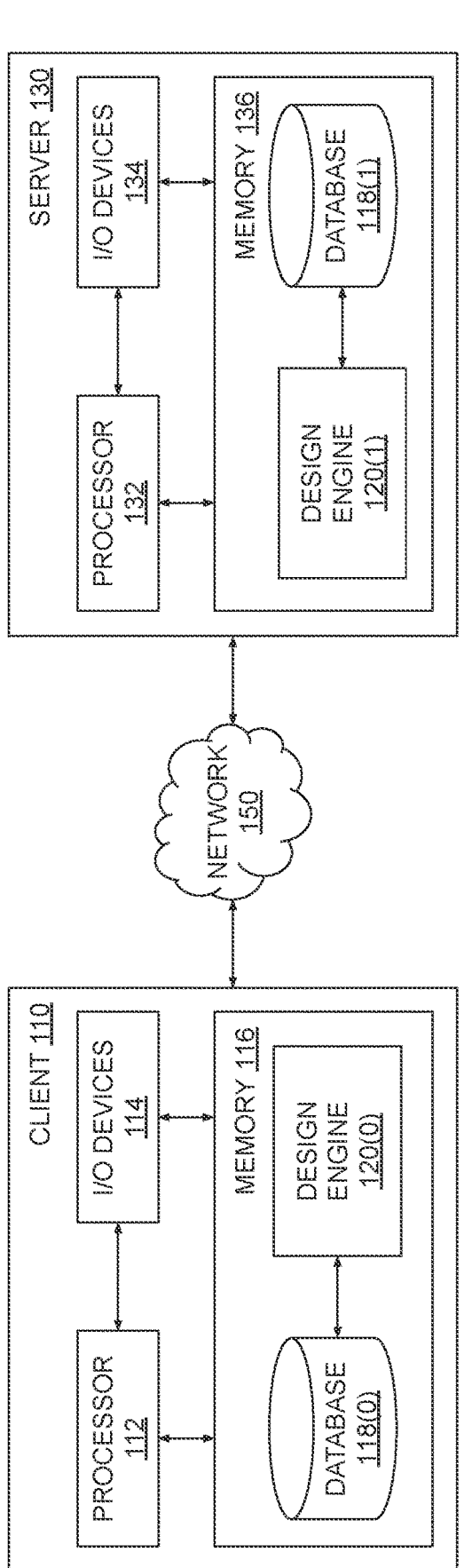

In the following description, numerous specific details are set forth to provide a more thorough understanding of the various embodiments. However, it will be apparent to one skilled in the art that the inventive concepts may be practiced without one or more of these specific details.

As noted above, a residential design company or other organization that operates on a "speculative" basis typically includes a design team that uses conventional CAD software to generate designs for multi-family housing projects. When generating designs, the design team typically has to work within the guidelines of local construction regulations to generate designs that are considered "feasible" to regulators and also has to work towards specific financial targets to generate designs that are considered "desirable" to landowners. Designs generated using conventional CAD software conceptually occupy distinct positions within a multi-dimensional "design space" that encompasses the universe of possible designs that could be generated for a given undeveloped parcel of land. A very small number of designs included in the design space are considered both feasible and desirable. This situation poses specific difficulties that conventional CAD software cannot effectively address.

In particular, conventional CAD software cannot effectively navigate the design space towards regions of the design space where feasible and desirable designs reside. Consequently, designs generated using conventional CAD software are predominately infeasible, undesirable, or both, which frequently causes landowners to reject most designs for multi-family housing projects. Conventional CAD software also cannot usually be used to modify a given design to incorporate feedback received from a landowner without adversely impacting either the desirability or the feasibility of the design, further limiting the success rate of designs generated via conventional CAD software.

To address these issues, various embodiments include a design engine that is configured to automatically generate designs for multi-family housing projects that simultaneously meet local construction regulations while also meeting specific financial targets. The design engine includes a design analyzer, a site analyzer, a design generator, and a design evaluator. The design analyzer generates design trends based on a historical database of designs. The site analyzer generates design criteria based on relevant construction regulations. The design generator generates design options that reflect the design trends while also complying with the construction regulations. The design evaluator analyzes the design options and generates various design metrics. The design metrics describe specific geometric properties of the design options as well as various financial projections associated with those design options. Based on the design metrics, the design generator generates additional design options that better meet the design criteria. The design engine and design evaluator operate iteratively in this manner to generate successively improved design options. During or after any given iteration, one or more of the design options can be modified based on user input. Subsequently, as needed, the modified design option(s) can be brought into compliance with construction regulations and/or modified to improve financial performance.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. These technical advantages represent tangible and meaningful technological improvements over conventional CAD applications.

System Overview

FIG. 1 illustrates a system configured to implement one or more aspects of the various embodiments. As shown, a system 100 includes a client 110 and a server 130 coupled together via a network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and/or a touchscreen, among others.

Memory 116 includes any technically feasible storage media configured to store data and software applications, such as, for example, a hard disk, a random-access memory (RAM) module, and/or a read-only memory (ROM). Memory 116 includes a database 118(0) and a design engine 120(0). Database 118(0) stores various data that is processed by design engine 120(0). Design engine 120(0) is a software application that, when executed by processor 112, interoperates with a corresponding software application executing on server 130 to perform various operations described in greater detail herein.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, and/or a touchscreen, among others.

Memory 136 includes any technically feasible storage media configured to store data and software applications, such as, for example, a hard disk, a RAM module, and/or a ROM. Memory 136 includes a database 118(1) and a design engine 120(1). Database 118(1) stores various data that is processed by design engine 120(1). Design engine 120(1) is a software application that, when executed by processor 132, interoperates with design engine 120(0) executing on client 110 to perform the various operations described in greater detail herein.

As a general matter, databases 118(0) and 118(1) represent separate portions of a distributed storage entity. Thus, for simplicity, databases 118(0) and 118(1) are collectively referred to hereinafter as database 118. Similarly, design engines 120(0) and 120(1) represent separate portions of a distributed software entity that is configured to perform any and all of the inventive operations described herein. Thus, for simplicity, design engines 120(0) and 120(1) are collectively referred to hereinafter as design engine 120.

In operation, design engine 120 is configured to automatically generate design options for multi-family housing projects that can be constructed on a given parcel of land. Design engine 120 is configured to generate the design options based on historical design trends as well as local construction regulations that govern development of the parcel of land. Design engine 120 analyzes the design options to identify those with projected financial performance that may be desirable to a landowner who owns the undeveloped parcel of land. Design engine 120 is further configured to incorporate into the identified design options various types of modifications that may be suggested by the landowner while maintaining compliance with local construction regulations. In this manner, design engine 120 is configured to support a "speculative" approach to multi-family housing project design and development.

Software Overview

Figure 2:
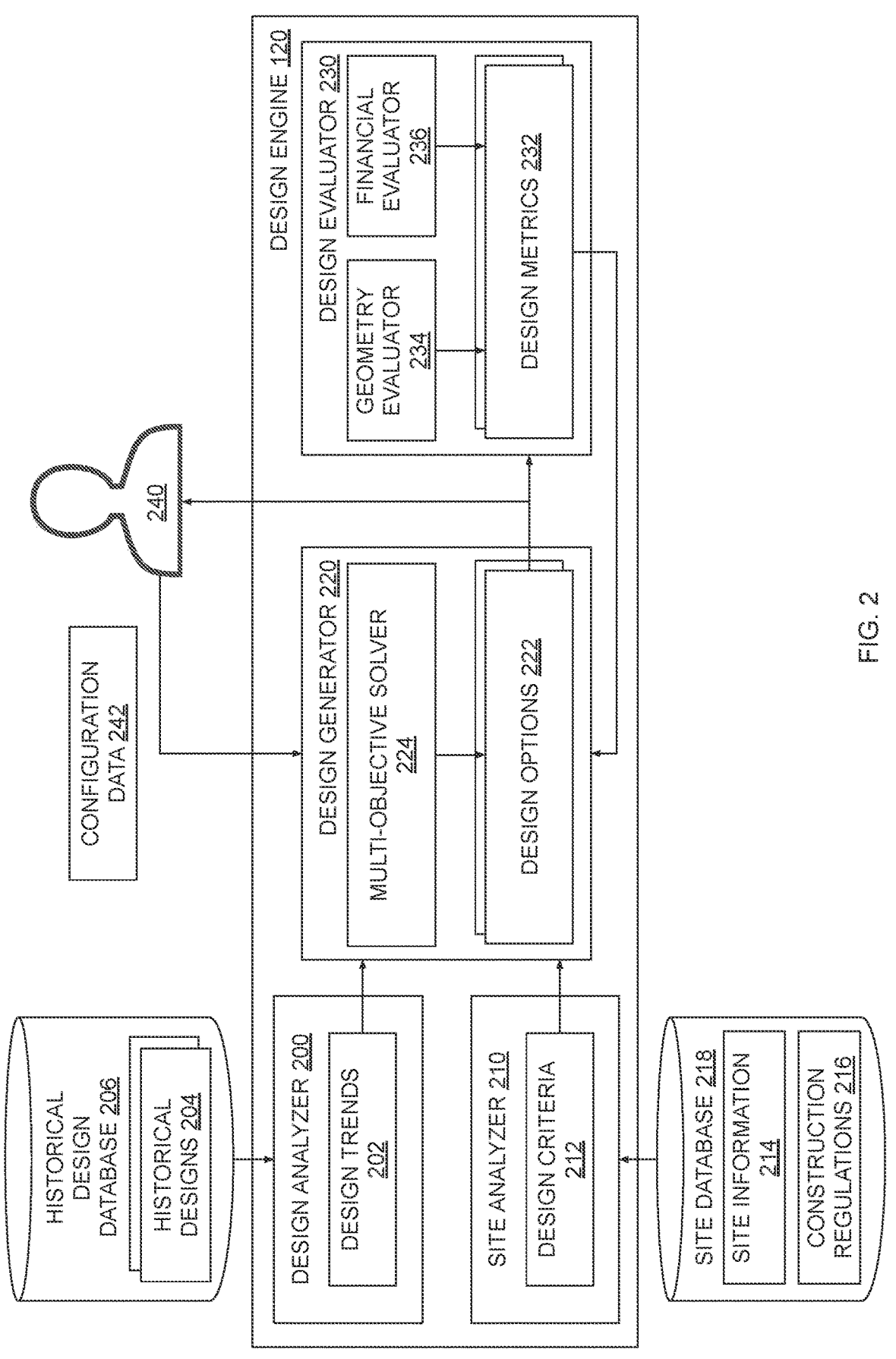
FIG. 2 is a more detailed illustration of the design engine of FIG. 1, according to various embodiments.

FIG. 2 is a more detailed illustration of the design engine of FIG. 1, according to various embodiments. As shown, design engine 120 includes a design analyzer 200, a site analyzer 210, a design generator 220, and a design evaluator 230. These various software modules are configured to interoperate with one another in order to implement the various operations performed by design engine 120.

Design analyzer 200 is configured to generate design trends 202 based on an analysis of historical designs 204 that reside within historical design database 206. Historical designs 204 generally include designs for multi-family housing projects that were previously accepted by landowners and used to develop corresponding parcels of land. Design trends 202 generally include geometric construction rules that can be used to generate designs having similar features to historical designs 204. Design analyzer 200 generates design trends 202 by performing a geometric analysis of historical designs 204 to extract a set of features from those designs and then parameterizing the extracted features to produce a set of parametric values. Design analyzer 200 determines various relationships between individual subsets of parametric values to generate one or more design trends 202.

For example, design analyzer 200 could analyze a set of historical designs 204 in which various apartment complexes are aligned in an East-West direction. Design analyzer 200 could extract an alignment feature from each historical design 204 and then parameterize the extracted features to generate a set of values representing the alignment of the various apartment complexes. Design analyzer 200 could then determine that the various parametric values are correlated with each other and generate a design trend 202 indicating that an East-West alignment for apartment complexes is preferable when generating design options 222. Persons skilled in the art will understand how these techniques can be applied to generate design trends 202 representing any technically feasible feature of historical designs 204.

Site analyzer 210 is configured to generate design criteria 212 based on an analysis of site information 214 and construction regulations 216 stored in site database 218. Site information 214 includes data and metadata associated with a given parcel of land, including a geographic location, a set of property boundaries, a property area value, geometric attributes of the parcel such as topology and/or topography, and so forth. Construction regulations 216 include various zoning regulations, building codes, land use requirements, and other types of governances that dictate how development of the parcel of land can and/or should occur. Construction regulations 216 may be applicable based on the geographic location of the parcel of land or specifically applicable to the parcel of land for various reasons.

Site analyzer 210 processes site information 214 and construction regulations 216 to synthesize a set of design criteria 212 that feasible designs should meet. A given design criterion 212 may include a design objective or a design constraint. A design objective could be, for example, that designs should maximize the amount of area that is devoted to buildings versus landscaping or other design features. A given design constraint could be, for example, that designs should not include buildings that are placed outside of property boundaries or exceed a given height.

Design generator 220 is configured to process design trends 202 and design criteria 212 in order to generate successive generations of design options 222. Each design option 222 describes a multi-family housing project corresponding to the parcel of land described in site information 214. Design generator 220 performs various geometric construction techniques to generate, for each design option 222, geometry that describes one or more buildings, parking lots and spaces, walkways, landscaping features, and other design elements typically found in multi-family housing projects. An exemplary design option 222 is described below in conjunction with FIG. 3. In one embodiment, design generator 220 may include a multi-objective solver 224 that is configured to implement a set of mathematical optimization algorithms to generate the various design elements found in each design option 222.

Design evaluator 230 is configured to generate various design metrics 232 that quantify specific attributes of design options 222. In particular, design evaluator 230 includes a geometry evaluator 234 that evaluates geometric attributes of design options 222 as well as a financial evaluator 236 that evaluates financial attributes of design options 222. Geometric evaluator 234 can generate any technically feasible type of metric associated with the geometry of a given design option 222, including the total square footage of the design option, the overall habitable volume of the design option, the floor area ratio (FAR) of the design option, the building coverage ratio (BCR) of the design option, and so forth. Financial evaluator 236 can generate any technically feasible type of metric that describes financial projections for a given design option 222, including the construction cost of the design option, the projected rental revenue of the design option, the return-on-investment (ROI) associated with the design option, and so forth. In various embodiments, geometric evaluator 234 and/or financial evaluator 236 can be used to quantify the degree to which design criteria 212 are met.

Figure 4:
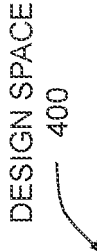
FIG. 4 is an exemplar design space that the design engine of FIG. 1 traverses to generate a design option, according to various embodiments.
Figure 4:
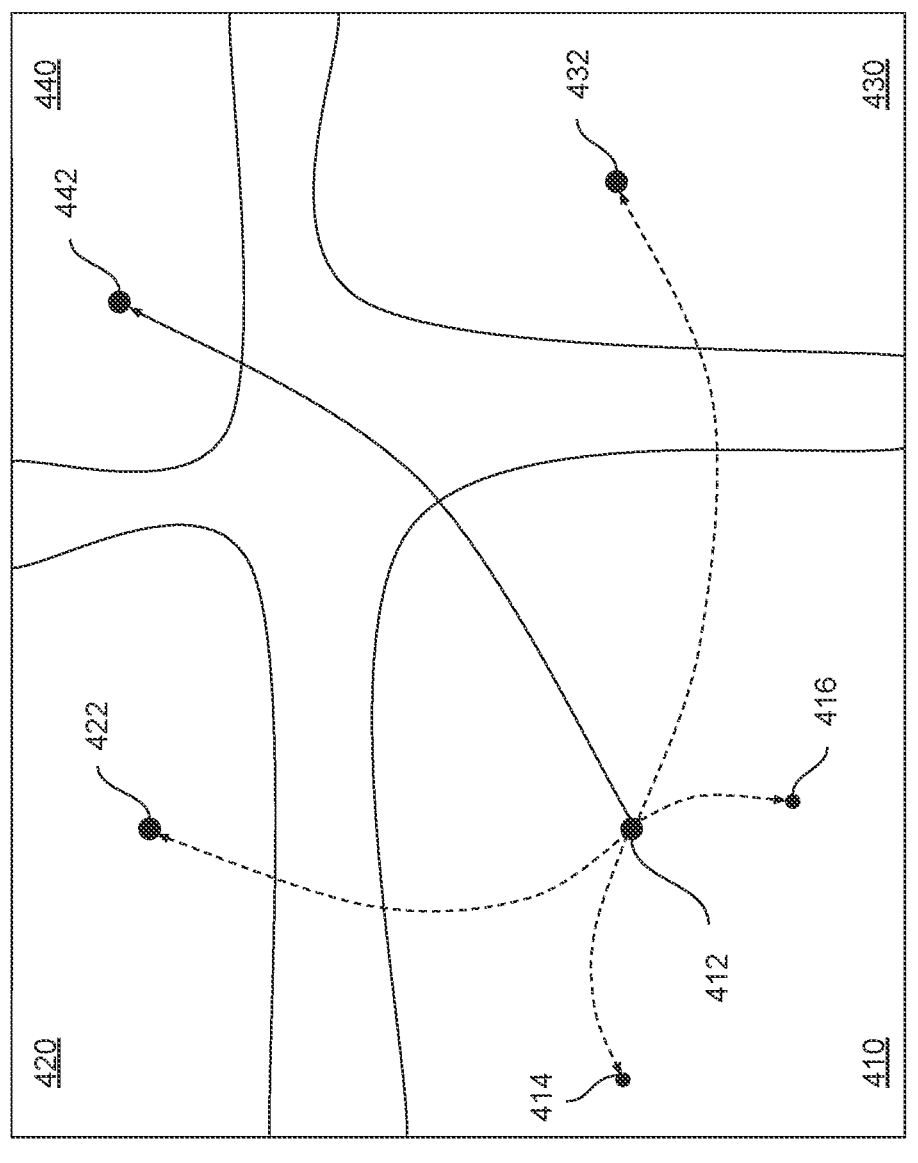

Design evaluator 230 generates design metrics 232 via geometry evaluator 234 and financial evaluator 236 and then provides those design metrics to design generator 220 in order to inform the generation of additional design options 222. In this manner, design generator 220 and design evaluator 230 operate iteratively in order to generate successive generations of design options 222 having design metrics 232 that improve over time while continuing to meet design criteria 212 and construction regulations 216. When certain convergence criteria are met, design generator 220 outputs design options 222 to user 240. In various embodiments, multi-objective solver 224 implements one or more evolutionary and/or genetic algorithms in order to modify design options 222, based on corresponding design metrics 232, in order to generate successive generations of design options 222. Via the above techniques, design generator 220 is configured to explore a vast multi-dimensional design space that includes a multitude of design options 222 having widely varying characteristics. With conventional CAD software, only a small subset of this design space is accessible, leading to designs that are either infeasible, undesirable, or both. FIG. 4 depicts how design generator 220 traverses this design space.

In one embodiment, design generator 220 is configured to obtain configuration data 242 from a user 240 and to then generate and/or modify design options 222 based on that data. Configuration data 242 may include any technically feasible type of data that can be used to guide the generation of design options 222, including financial targets for design options 222, design preferences related to the layout and/or orientation of buildings within the multi-family housing project, target occupancy metrics for the multi-family housing project, design rules and/or constraints that reflect various aesthetic preferences of user 240 and/or the landowner, landowner feedback in general, and so forth.

In various embodiments, design engine 120 may perform computer simulations of various design elements included in each design option 222 to generate one or more designs.

Design engine 120 may then render those designs for display to a user via a display device. Design engine 120 may also generate a graphical user interface (GUI) and render the GUI for display to the user via the display device. Using one or more input devices, the user may then interact with the rendered design(s) using the GUI in order to input feedback, alter design criteria, and make other modifications to those designs. Design engine 120 may then run further simulations to generate additional design options 222 and then render updated designs for display to the user.

Advantageously, the techniques described above can be incorporated into CAD software to enable the CAD software to automatically generate and/or modify designs for multi-family housing projects that balance the competing objectives of complying with complex construction regulations and simultaneously achieving target financial projections. Accordingly, CAD software that implements the disclosed techniques can reliably and deterministically generate designs for multi-family housing projects that are considered both feasible from a regulatory standpoint and desirable from a financial performance perspective.

Generating Design Options

Figure 3:
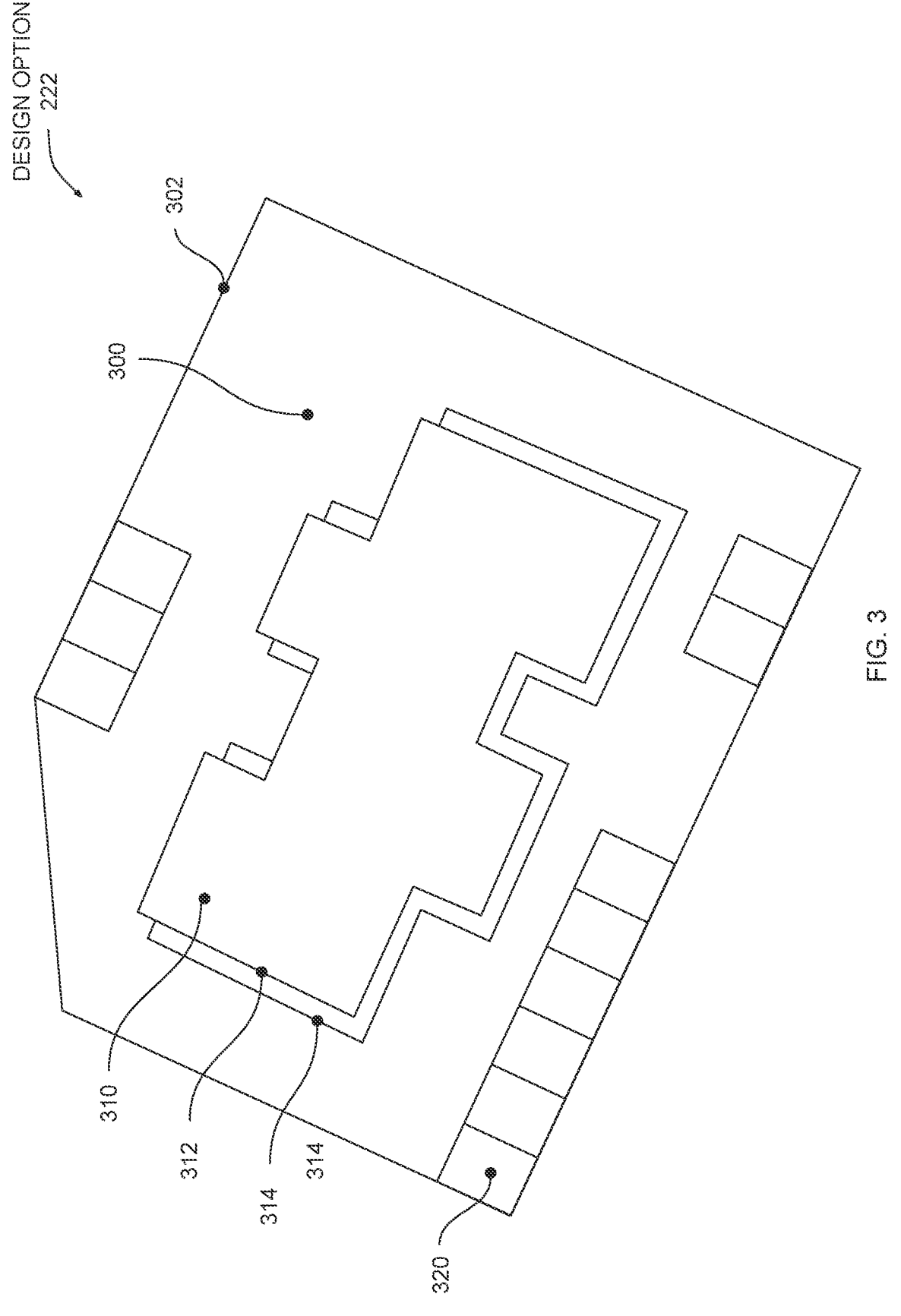
FIG. 3 is an exemplar design option generated by the design engine of FIG. 1, according to various embodiments.

FIG. 3 is an exemplar design option generated by the design engine of FIG. 1, according to various embodiments. As shown, design option 222 includes a parcel 300 of land and an associated property boundary 302. Property boundary 302 generally circumscribes the area of parcel 300. Site information 214 includes various data that defines geometry associated with parcel 300 and property boundary 302, such as, for example, geospatial data, survey data, and the like. Design option 222 further includes a building 310 along with an associated building boundary 312 and roof footprint 314. Building boundary 312 generally circumscribes the area of building 310, while roof footprint 314 generally circumscribes an area associated with the roof of building 310 (not shown). Design option 222 also includes a plurality of parking spaces 320 disposed proximate to building 310.

When generating design option 222, design generator 220 processes design criteria 212 to define parcel 300 and property boundary 302. Design generator 220 then performs various geometric construction techniques, based on parcel 300 and property 302, to generate geometry for building 310 and parking spaces 320. In doing so, design generator 220 applies design trends 202 to generate various geometric features that define building 310 and parking spaces 320. For example, design generator 220 could apply a design trend 202 related to corner placement in order to generate and place the various corners of building 310. In another example, design generator 220 could apply a design trend 202 related to parking space placement in order to align parking spaces 320 along one side of property boundary 302. In one embodiment, design generator 220 may implement a shape grammar construction technique to generate and place parking spaces 320.

Once geometry is generated for building 310 and parking spaces 320 in the manner described above, design generator 220 repositions building 310 and/or parking spaces 320 as needed in order to efficiently use the area of parcel 300 and mitigate any overlapping geometry. In one embodiment, design generator 220 may implement a rigid body simulation whereby building 310 and parking spaces 320 are repositioned according to various laws of motion until any overlapping geometry is eliminated.

Design generator 220 performs the above techniques when generating any given design option 222 and may further implement various generative design techniques in order to generate successive generations of design options 222. For example, design generator 220 may implement a recombination technique in order to combine design elements from multiple design options 222. Design generator 220 could also implement a mutation technique in order to vary specific design elements of any given design option 222. Any and all such techniques generally fall within the scope of operations performed by design generator 220 in general, and multi-objective solver 224 in particular. In various embodiments, design generator 220 may process design metrics 232 in order to identify specific design options 222 that should be subject to recombination and/or mutation when generating successive generations of design options 222. Via these techniques, design engine 120 implements design generator 220 to traverse a vast multi-dimensional design space and generate design options 222 that cannot be generated through traditional techniques.

FIG. 4 is an exemplar design space that the design engine of FIG. 1 traverses to generate a design option, according to various embodiments. As shown, design space 400 includes four distinct regions where various types of design options 222 reside. Region 410 of design space 400 includes design options 222 that do not comply with construction regulations 216 included in design criteria 212 and do not meet financial targets set forth in configuration data 242. Design options 222 that reside in region 410 are therefore considered infeasible from a regulatory standpoint and undesirable from a financial perspective. Region 420 of design space 400 includes design options 222 that comply with construction regulations 216 but do not meet the aforementioned financial targets. Design options 222 that reside in region 420 are thus considered feasible from a regulatory standpoint but undesirable from a financial perspective. Region 430 of design space 400 includes design options 222 that do not comply with construction regulations 216 but do, in fact, meet the financial targets set forth in configuration data 242. Design options 222 that reside in region 430 are accordingly considered infeasible from a regulatory standpoint but desirable from a financial perspective. Finally, region 440 of design space 400 includes design options 222 that both comply with construction regulations 216 and meet the financial targets set forth in configuration data 242. Design options 222 that reside in region 440 are considered both feasible from a regulatory standpoint and desirable from a financial perspective.

The different regions of design space 400, as shown, are not drawn precisely to scale. However, the relative proportions of these regions are drawn to indicate that region 440, which includes design options 222 that are considered both feasible and desirable, is significantly smaller than regions 410, 420, and 430, which includes design options 222 that are considered infeasible, undesirable, or both. During a conventional design process, a design team typically uses conventional CAD software to generate design options that reside in region 410, such as design option 412, and may then attempt to modify that design option using the conventional CAD software to increase feasibility and/or desirability.

In the above process, conventional CAD software often generates additional design options that are still considered infeasible and undesirable, such as design options 414 and/or 416. Occasionally, conventional CAD software generates design options that are feasible but undesirable, such as design option 422, or design options that are infeasible but desirable, such as design option 432. Among other factors, conventional CAD software typically functionality for balancing the multitude of factors that contribute to the feasibility and desirability of a given design option 222 and therefore cannot traverse design space 400 in an informed or deterministic manner towards regions that strike a balance between feasibility and desirability. In practice, design teams usually use conventional CAD software to traverse design spaces such as that shown in a non-deterministic manner that is primarily guided by intuition, and therefore generate design options that are both feasible and desirable very infrequently.

Contrary to conventional CAD software, the disclosed design engine 120 is configured to traverse design space 400 guided by design metrics 232 described above and can therefore deterministically traverse design space 400 towards region 440, where potentially numerous design options 222 reside that are both feasible and desirable, such as design option 442. Furthermore, the disclosed design engine 120 can modify a given design option 222 in order to incorporate landowner feedback by further exploring region 440 to determine design options 222 which incorporate that feedback while maintaining compliance with regulations and achieving financial targets. In one embodiment design engine 120 may perform a sensitivity analysis with multiple dimensions of design space 400 to determine specific regions of design space where feasible and desirable design options are likely to reside. Design engine 120 represents a significant improvement over conventional CAD software that operates non-deterministically and therefore with very limited success. Importantly, design teams cannot perform the disclosed techniques because the design space typically includes a vast number of dimensions, making the design space impossible to navigate without using software such as the disclosed design engine 120.

Figure 5:
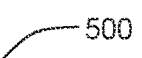
FIG. 5 is a flow diagram of method steps for generating design options for a multi-family housing project, according to various embodiments.
Figure 5:
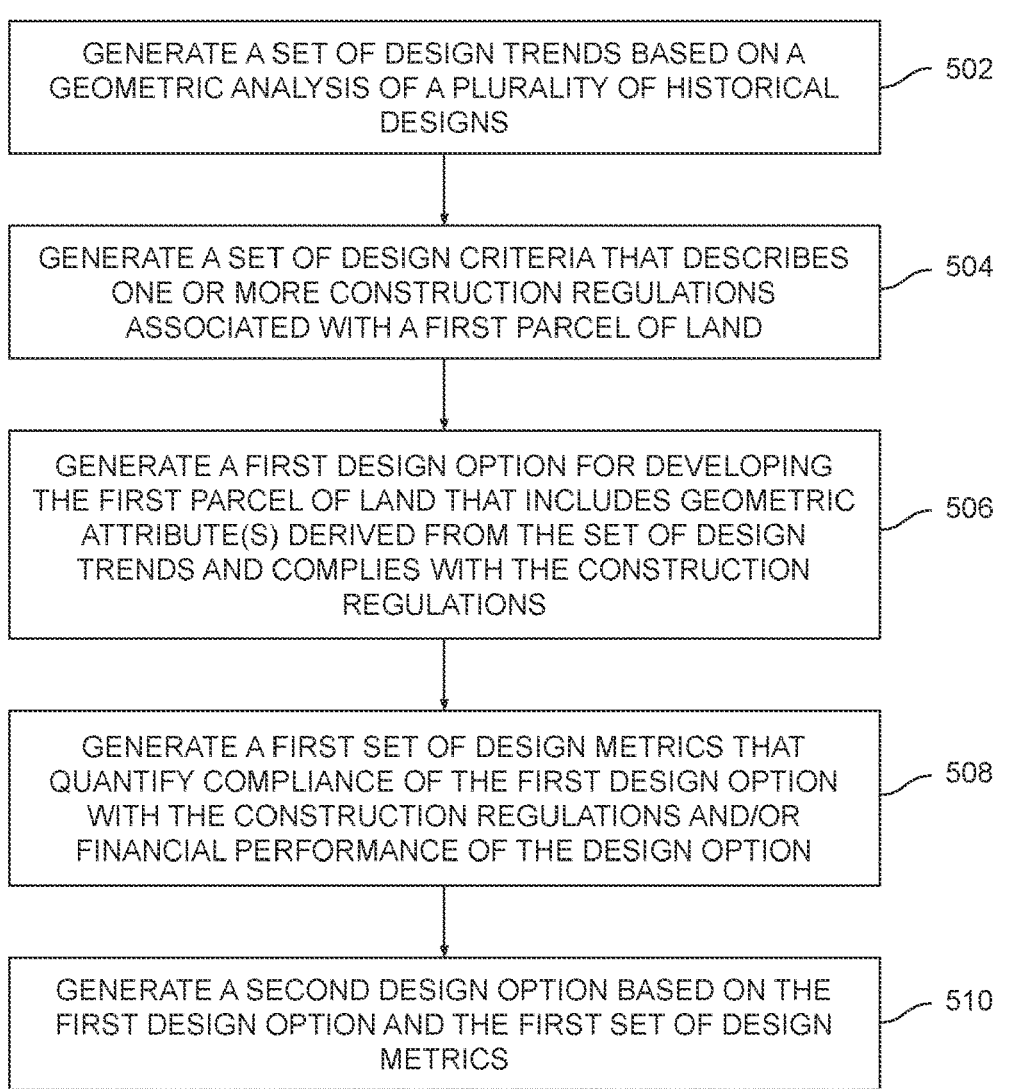

FIG. 5 is a flow diagram of method steps for generating design options for a multi-family housing project, according to various embodiments. Although the method steps are described in conjunction with the systems of FIGS. 1-4, persons skilled in the art will understand that any system configured to perform the method steps in any order falls within the scope of the present embodiments.

As shown, a method 500 begins at step 502, where design analyzer 200 within design engine 120 generates a set of design trends 202 based on a geometric analysis of a plurality of historical designs 204. Each historical design 204 corresponds to a multi-family housing project that may have been previously accepted by a landowner and used to develop a corresponding parcel of land. Accordingly, a given historical design may include design features that confer feasibility and/or desirability. A design trend 202 generally includes geometric construction rules that can be used to generate designs having such design features.

At step 502, site analyzer 210 within design engine 120 generates a set of design criteria 212 that describes one or more construction regulations 216 associated with a first parcel of land. Construction regulations 216 reflect various zoning regulations, building codes, land use requirements, and other types of governances that dictate how development of the parcel of land can and/or should occur. When generating design criteria 212, site analyzer 210 also analyzes site information 214 that includes a geographic location, a set of property boundaries, a property area value, geometric attributes of the parcel such as topology and/or topography, and other data and/or metadata associated with the parcel of land.

At step 504, design generator 220 within design engine 120 generates a first design option 222 for developing the first parcel of land that includes one or more geometric attribute(s) derived from the set of design trends 212 and adheres to construction regulations 216. Design generator 220 performs various geometric construction techniques to generate, for each design option 222, geometry that describes one or more buildings, parking lots and spaces, walkways, landscaping features, and other design elements typically found in multi-family housing projects. In one embodiment, design generator 220 may include a multi-objective solver 224 that is configured to implement a set of mathematical optimization algorithms to generate the various design elements found in each design option 222.

At step 506, design evaluator 230 generates a first set of design metrics 232 that quantify compliance of the first design option 222 with construction regulations 216 and/or projected financial performance of the design option 222. Design evaluator 230 includes a geometry evaluator 234 that can generate any technically feasible type of metric associated with the geometry of a given design option 222, including the total square footage of the design option, the overall habitable volume of the design option, a FAR value for the design option, a BCR value for the design option, and so forth. Design evaluator 230 also includes a financial evaluator 236 that can generate any technically feasible type of metric that describes financial projections for a given design option 222, including the construction cost of the design option, the projected rental revenue of the design option, an ROI value for the design option, and so forth.

At step 508, design generator 220 generates a second design option based on the first design option and the first set of design metrics. In this manner, design generator 220 and design evaluator 230 operate iteratively in order to generate successive generations of design options 222 having design metrics 232 that improve over time while continuing to meet design criteria 212, including construction regulations 216. In various embodiments, multi-objective solver 224 implements one or more evolutionary and/or genetic algorithms in order to modify design options 222, based on corresponding design metrics 232, in order to generate successive generations of design options 222. Via the above techniques, design generator 220 is configured to traverse a vast multi-dimensional design space that includes a multitude of design options 222 having widely varying characteristics.

In sum, a design engine is configured to automatically generate designs for multi-family housing projects that simultaneously meet local construction regulations while also meeting specific financial targets. The design engine includes a design analyzer, a site analyzer, a design generator, and a design evaluator. The design analyzer generates design trends based on a historical database of designs. The site analyzer generates design criteria based on relevant construction regulations. The design generator generates design options that reflect the design trends while also complying with construction regulations. The design evaluator analyzes the design options and generates various design metrics. The design metrics describe specific geometric properties of the design options as well as various financial projections associated with those design options. Based on the design metrics, the design generator generates additional design options that better meet the design criteria. The design engine and design evaluator operate iteratively in this manner to generate successively improved design options. During or after any given iteration, one or more of the design options can be modified based on user input. Subsequently, as needed, the modified design option(s) can be brought into compliance with construction regulations and/or modified to improve financial performance.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. These technical advantages represent tangible and meaningful technological improvements over conventional CAD applications.

1. Some embodiments include a computer-implemented method for generating designs for multi-family housing projects via a computer-aided design (CAD) application, the method comprising generating, via a design analyzer included in the CAD application, a set of design trends based on a geometric analysis of a plurality of historical designs, generating, via a site analyzer included in the CAD application, a set of design criteria that describe one or more construction regulations associated with a first parcel of land, generating, via a design generator included in the CAD application, a first design option for developing the first parcel of land, wherein the first design option includes at least one geometric attribute derived from the set of design trends and complies with each of the one or more construction regulations.

2. The computer-implemented method of clause 1, wherein generating the set of design trends comprises automatically extracting a set of features from the plurality of historical designs during the geometrical analysis, generating a set of parametric values that numerically define the set of features, determining a set of correlations between two or more subsets of parametric values included in the set of parametric values, generating the set of design trends based on the set of correlations.

3. The computer-implemented method of any of clauses 1-2, wherein generating the set of design criteria comprises determining a first geometric constraint that governs the construction of one or more buildings on the first parcel of land.

4. The computer-implemented method of any of clauses 1-3, wherein generating the first design option comprises determining a building boundary that defines a region of the parcel of land where a building should be constructed, and determining a set of locations for a plurality of parking spaces that reside proximate to at least one of the building or a property boundary associated with the parcel of land.

5. The computer-implemented method of any of clauses 1-4, further comprising generating, via a design evaluator included in the CAD application, a set of design metrics that quantify compliance of the first design option with the one or more construction regulations.

6. The computer-implemented method of any of clauses 1-5, further comprising generating, via a design evaluator included in the CAD application, a set of design metrics that quantify a projected financial performance of the first design option.

7. The computer-implemented method of any of clauses 1-6, further comprising generating, via the design generator, a second design option based on a set of design metrics, wherein the set of design metrics quantifies at least one of compliance of the first design option with the one or more construction regulations or a projected financial performance of the first design option.

8. The computer-implemented method of any of clauses 1-7, wherein the design generator is configured to traverse a design space from an initial design option to the first design option, wherein the initial design option does not comply with at least one construction regulation.

9. The computer-implemented method of any of clauses 1-8, wherein the design generator is configured to traverse a design space from an initial design option to the first design option, wherein the initial design option does not meet at least one financial performance target, but the first design option does meet the at least one financial performance target.

10. The computer-implemented method of any of clauses 1-9, wherein the design generator includes a multi-objective solver configured to perform a plurality of topology generation operations to generate the first design option.

11. Some embodiments include a non-transitory computer-readable medium storing program instructions that, when executed by a processor, cause the processor to generate designs for multi-family housing projects via a computer-aided design (CAD) application by performing the steps of generating, via a design analyzer included in the CAD application, a set of design trends based on a geometric analysis of a plurality of historical designs, generating, via a site analyzer included in the CAD application, a set of design criteria that describe one or more construction regulations associated with a first parcel of land, generating, via a design generator included in the CAD application, a first design option for developing the first parcel of land, wherein the first design option includes at least one geometric attribute derived from the set of design trends and complies with each of the one or more construction regulations.

12. The non-transitory computer-readable medium of clause 11, wherein the step of generating the set of design trends comprises automatically extracting a set of features from the plurality of historical designs during the geometrical analysis, generating a set of parametric values that numerically define the set of features, determining a set of correlations between two or more subsets of parametric values included in the set of parametric values, generating the set of design trends based on the set of correlations.

13. The non-transitory computer-readable medium of any of clauses 11-12, wherein the step of generating the set of design criteria comprises determining a first geometric constraint that governs the construction of one or more buildings on the first parcel of land.

14. The non-transitory computer-readable medium of any of clauses 11-13, wherein the step of generating the first design option comprises determining a building boundary that defines a region of the parcel of land where a building should be constructed, and determining a set of locations for a plurality of parking spaces that reside proximate to at least one of the building or a property boundary associated with the parcel of land.

15. The non-transitory computer-readable medium of any of clauses 11-14, further comprising the step of generating, via a design evaluator included in the CAD application, a set of design metrics that quantify compliance of the first design option with the one or more construction regulations or a projected financial performance of the first design option.

16. The non-transitory computer-readable medium of any of clauses 11-15, further comprising the step of generating, via the design generator, a second design option based on a set of design metrics, wherein the set of design metrics quantifies at least one of compliance of the first design option with the one or more construction regulations or a projected financial performance of the first design option.

17. The non-transitory computer-readable medium of any of clauses 11-16, wherein the design generator is configured to traverse a design space from an initial design option to the first design option, wherein the initial design option does not comply with at least one construction regulation, and wherein the initial design option does not meet at least one financial performance target, but the first design option does meet the at least one financial performance target.

18. The non-transitory computer-readable medium of any of clauses 11-17, wherein the design generator implements a shape grammar algorithm to generate at least a portion of the first design option.

19. The non-transitory computer-readable medium of any of clauses 11-18, wherein the design generator implements a rigid body simulation to generate at least a portion of the first design option.

20. Some embodiments include a system, comprising a memory storing a computer-aided design (CAD) application, and a processor that, when executing the CAD application, is configured to perform the steps of generating, via a design analyzer included in the CAD application, a set of design trends based on a geometric analysis of a plurality of historical designs, generating, via a site analyzer included in the CAD application, a set of design criteria that describe one or more construction regulations associated with a first parcel of land, and generating, via a design generator included in the CAD application, a first design option for developing the first parcel of land, wherein the first design option includes at least one geometric attribute derived from the set of design trends and complies with each of the one or more construction regulations.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs for multi-family housing projects via a computer-aided design (CAD) application, the method comprising:

generating, via a design generator included in the CAD application, a plurality of design options for developing a first parcel of land;

generating, via a design evaluator included in the CAD application, a first set of metrics that quantify a degree of compliance of each design option included in the plurality of design options with a set of construction regulations associated with the first parcel of land, wherein the set of construction regulations comprises at least one of a zoning regulation or a building code;

generating, via the design evaluator included in the CAD application, a second set of metrics that quantify a degree of compliance of each design option included in the plurality of design options with a set of financial targets, wherein the plurality of design options comprises a design space that includes a plurality of regions defined by the first set of metrics and the second set of metrics, the plurality of regions comprising a first region that includes only design options included in the plurality of design options that comply with both the set of construction regulations and the set of financial targets and a second region that includes only design options included in the plurality of design options that do not comply with at least one of the set of construction regulations or the set of financial targets;

selecting a first design option from the plurality of design options by traversing the design space to the first region of the design space to select the first design option included in the first region; and generating, via the design generator, at least one additional design option based on the first design option.

2. The computer-implemented method of claim 1, further comprising generating, via a design analyzer included in the CAD application, a set of design trends based on a geometric analysis of a plurality of historical designs, wherein the first design option includes at least one geometric attribute derived from the set of design trends, wherein generating the set of design trends comprises:

automatically extracting a set of features from the plurality of historical designs during the geometric analysis;

generating a set of parametric values that numerically define the set of features;

determining a set of correlations between two or more subsets of parametric values included in the set of parametric values; and generating at least a first design trend that indicates a first parametric value included in the set of parametric values that is preferred for a first feature included in the set of features based on the set of correlations.

3. The computer-implemented method of claim 1, further comprising generating, via a site analyzer included in the CAD application, a set of design criteria that describe the set of construction regulations associated with a first parcel of land, wherein generating the set of design criteria comprises determining a first geometric constraint that governs the construction of one or more buildings on the first parcel of land.

4. The computer-implemented method of claim 1, wherein generating the first design option comprises:

determining a building boundary that defines a region of a parcel of land where a building should be constructed; and determining a set of locations for a plurality of parking spaces that reside proximate to at least one of the building or a property boundary associated with the parcel of land.

5. The computer-implemented method of claim 1, wherein the design generator is configured to traverse the design space from an initial design option to the first design option, wherein the initial design option does not comply with at least one construction regulation.

6. The computer-implemented method of claim 1, wherein the design generator is configured to traverse the design space from an initial design option to the first design option, wherein the initial design option does not meet at least one financial target, but the first design option does meet the at least one financial target.

7. The computer-implemented method of claim 1, wherein the design generator includes a multi-objective solver configured to perform a plurality of topology generation operations to generate the first design option.

8. The computer-implemented method of claim 1, wherein generating the at least one additional design option comprises executing a recombination technique on the first design option and another design option in the plurality of design options.

9. The computer-implemented method of claim 8, wherein executing the recombination technique comprises combining one or more geometric attributes of the first design option and one or more geometric attributes of the another design option to generate the at least one additional design option.

10. The computer-implemented method of claim 1, wherein generating the at least one additional design option comprises executing a mutation technique on the first design option.

11. The computer-implemented method of claim 10, wherein executing the mutation technique comprises varying one or more geometric attributes of the first design option to generate the at least one additional design option.

12. The computer-implemented method of claim 1, wherein the second region comprises a first sub-region that includes only design options included in the plurality of design options that comply with the set of construction regulations and does not comply with the set of financial targets, a second sub-region that includes only design options included in the plurality of design options that do not comply with the set of construction regulations and complies with the set of financial targets, and a third sub-region that includes only design options included in the plurality of design options that do not comply with the set of construction regulations and do not comply with the set of financial targets.

13. The computer-implemented method of claim 1, wherein generating the at least one additional design option comprises executing a recombination technique on the first design option and another design option included in the first region of the design space.

14. A non-transitory computer-readable medium storing program instructions that, when executed by a processor, cause the processor to generate designs for multi-family housing projects via a computer-aided design (CAD) application by performing the steps of:

generating, via a design generator included in the CAD application, a plurality of design options for developing a first parcel of land;

generating, via a design evaluator included in the CAD application, a first set of metrics that quantify a degree of compliance of each design option included in the plurality of design options with a set of construction regulations associated with the first parcel of land, wherein the set of construction regulations comprises at least one of a zoning regulation or a building code;

generating, via the design evaluator included in the CAD application, a second set of metrics that quantify a degree of compliance of each design option included in the plurality of design options with a set of financial targets, wherein the plurality of design options comprises a design space that includes a plurality of regions defined by the first set of metrics and the second set of metrics, the plurality of regions comprising a first region that includes only design options included in the plurality of design options that comply with both the set of construction regulations and the set of financial targets and a second region that includes only design options included in the plurality of design options that do not comply with at least one of the set of construction regulations or the set of financial targets;

selecting a first design option from the plurality of design options by traversing the design space to the first region of the design space to select the first design option included in the first region; and generating, via the design generator, at least one additional design option based on the first design option.

15. The non-transitory computer-readable medium of claim 14, further comprising the step of generating, via a design analyzer included in the CAD application, a set of design trends based on a geometric analysis of a plurality of historical designs, wherein the first design option includes at least one geometric attribute derived from the set of design trends, wherein generating the set of design trends comprises:

automatically extracting a set of features from the plurality of historical designs during the geometric analysis;

generating a set of parametric values that numerically define the set of features;

determining a set of correlations between two or more subsets of parametric values included in the set of parametric values; and generating at least a first design trend that indicates a first parametric value included in the set of parametric values that is preferred for a first feature included in the set of features based on the set of correlations.

16. The non-transitory computer-readable medium of claim 14, further comprising generating, via a site analyzer included in the CAD application, a set of design criteria that describe the set of construction regulations associated with a first parcel of land, wherein the step of generating the set of design criteria comprises determining a first geometric constraint that governs the construction of one or more buildings on the first parcel of land.

17. The non-transitory computer-readable medium of claim 14, wherein the step of generating the first design option comprises:

determining a building boundary that defines a region of a parcel of land where a building should be constructed; and determining a set of locations for a plurality of parking spaces that reside proximate to at least one of the building or a property boundary associated with the parcel of land.

18. The non-transitory computer-readable medium of claim 14, wherein the design generator is configured to traverse the design space from an initial design option to the first design option, wherein the initial design option does not comply with at least one construction regulation, and wherein the initial design option does not meet at least one financial target, but the first design option does meet the at least one financial target.

19. The non-transitory computer-readable medium of claim 14, wherein the design generator implements a shape grammar algorithm to generate at least a portion of the first design option.

20. The non-transitory computer-readable medium of claim 14, wherein the design generator implements a rigid body simulation to generate at least a portion of the first design option.

21. A system, comprising:

a memory storing a computer-aided design (CAD) application; and a processor that, when executing the CAD application, is configured to perform the steps of:

generating, via a design generator included in the CAD application, a plurality of design options for developing a first parcel of land, generating, via a design evaluator included in the CAD application, a first set of metrics that quantify a degree of compliance of each design option included in the plurality of design options with a set of construction regulations associated with the first parcel of land, wherein the set of construction regulations comprises at least one of a zoning regulation or a building code, generating, via the design evaluator included in the CAD application, a second set of metrics that quantify a degree of compliance of each design option included in the plurality of design options with a set of financial targets, wherein the plurality of design options comprises a design space that includes a plurality of regions defined by the first set of metrics and the second set of metrics, the plurality of regions comprising a first region that includes only design options included in the plurality of design options that comply with both the set of construction regulations and the set of financial targets and a second region that includes only design options included in the plurality of design options that do not comply with at least one of the set of construction regulations or the set of financial targets, selecting a first design option from the plurality of design options by traversing the design space to the first region of the design space to select the first design option included in the first region, and generating, via the design generator, at least one additional design option based on the first design option.

* * * * *